(12) United States Patent
Haenni

(10) Patent No.: US 7,165,313 B2
(45) Date of Patent: Jan. 23, 2007

(54) METHOD OF PRODUCING AN ELECTRIC MOTOR

(75) Inventor: Frédéric Haenni, Fribourg (CH)

(73) Assignee: Saia-Burgess Murten AG, Murten (CH)

( * ) Notice: Subject to any disclaimer, the term of this patent is extended or adjusted under 35 U.S.C. 154(b) by 193 days.

(21) Appl. No.: 10/419,139

(22) Filed: Apr. 21, 2003

(65) Prior Publication Data

US 2003/0201679 A1 Oct. 30, 2003

(30) Foreign Application Priority Data

Apr. 30, 2002 (EP) ................................. 02405352

(51) Int. Cl.
*H02K 15/00* (2006.01)

(52) U.S. Cl. ..................... 29/596; 29/598; 29/732; 29/747; 310/42

(58) Field of Classification Search ............... 29/596, 29/598, 732, 747; 310/42, 49 R, 257, 18, 310/89, 156

See application file for complete search history.

(56) References Cited

U.S. PATENT DOCUMENTS

| 3,633,055 | A | * | 1/1972 | Maier ..................... 310/156.26 |
| 3,916,228 | A | | 10/1975 | Knurr et al. |
| 4,174,485 | A | * | 11/1979 | Soden et al. .................. 310/89 |
| 4,355,248 | A | * | 10/1982 | Manson ....................... 310/42 |
| 4,942,325 | A | * | 7/1990 | Fukaya ....................... 310/257 |
| 5,283,487 | A | * | 2/1994 | Oki et al. ................. 310/49 R |
| 5,325,003 | A | * | 6/1994 | Saval et al. ................... 310/43 |
| 5,329,199 | A | * | 7/1994 | Yockey et al. .............. 310/263 |

FOREIGN PATENT DOCUMENTS

| EP | 1 168 576 A1 | 1/2002 |
| WO | WO 97/48173 A1 | 12/1997 |

* cited by examiner

*Primary Examiner*—A. Dexter Tugbang
*Assistant Examiner*—Tai Van Nguyen
(74) *Attorney, Agent, or Firm*—Foley & Lardner LLP

(57) ABSTRACT

An electric motor, in particular a stepper motor, comprises a first rigid component having a recess and a second rigid component having a protrusion. The protrusion is at least partially oversized relative to the recess before assembling the first and second component. For the assembly the protrusion is pressed into the recess with a predetermined pressure for forming a rigid connection between the first component and the second component.

6 Claims, 3 Drawing Sheets

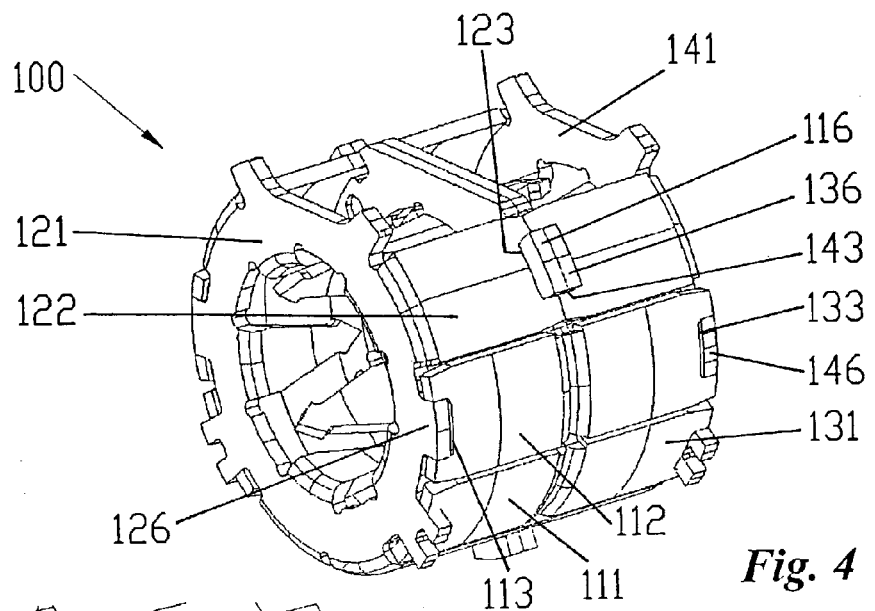
Fig. 4
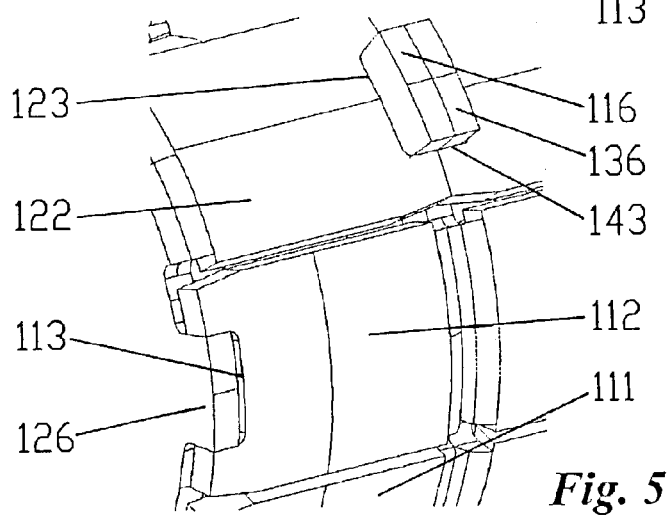
Fig. 5
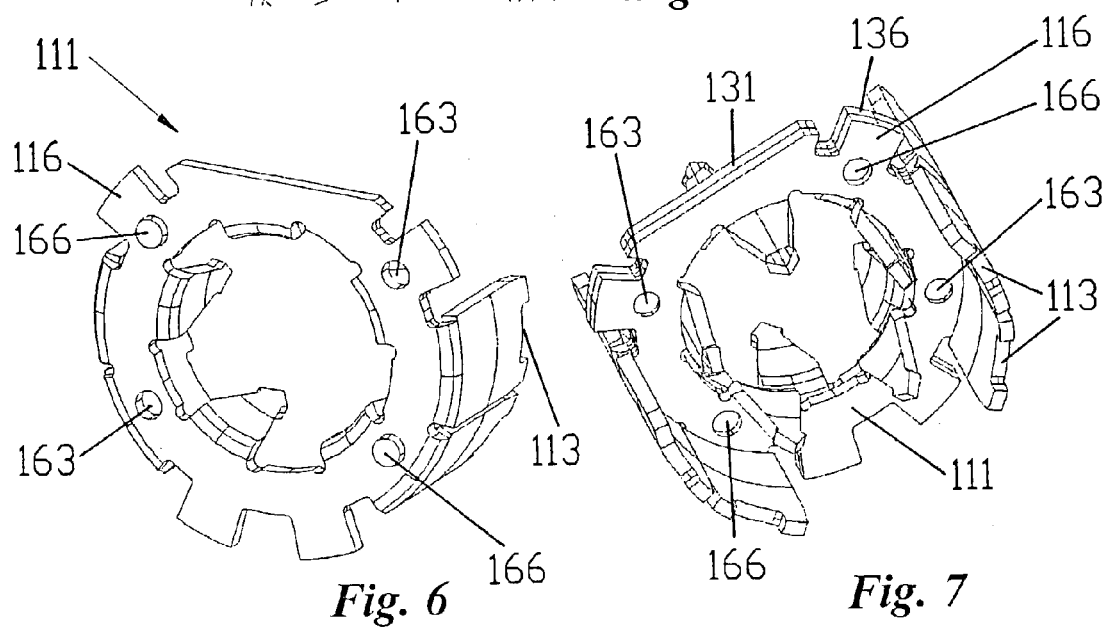
Fig. 6       Fig. 7

METHOD OF PRODUCING AN ELECTRIC MOTOR

FIELD OF THE INVENTION

The present invention concerns an electric motor, in particular a stepper motor, and a method of producing an electric motor, in particular a stepper motor.

BACKGROUND OF THE INVENTION

Known electric motors, in particular stepper motors, are subjected to vibrations during operation, which can cause a relatively large noise. Such noise, however, is rather annoying for the operator in particular of stepper motors used for instance in cars.

SUMMARY OF THE INVENTION

A first aim of the invention is therefore to provide an electric motor which produces less audible noise caused by vibrations.

A second aim of the invention is to provide a method of producing an electric motor which produces less audible noise caused by vibrations.

According to the present invention the first aim is obtained with an electric motor comprising:

a first rigid component having a first recess and
a second rigid component having a first protrusion which is at least partially oversized relative to the first recess before assembling the first and second component, so that for the assembly the first protrusion is adapted to be pressed into the first recess with a predetermined pressure for forming a rigid connection between the first and second rigid component.

According to the present invention the second aim is obtained with a method of producing an electric motor, the method comprising the steps of:

producing a first rigid component, in particular a first stator, with a first recess;
producing a second rigid component, in particular a second stator, with a first protrusion being at least partially oversized relative to the first recess; and
pressing the first protrusion into the first recess with a predetermined pressure for forming a rigid connection between the first and second component.

The main advantage of electric motor and the method according to the invention is that the electric motor vibrates in a reduced manner and has a reduced noise level during operation.

BRIEF DESCRIPTION OF THE DRAWINGS

Examples of embodiments of the electric motor and the method according to the invention are described below with reference to the accompanying figures wherein:

FIG. 4 shows a second embodiment of the electric motor according to the invention, FIG. 5 shows a detail of FIG. 4, FIG. 6 shows exclusively the first inner stator of the electric motor of FIG. 4, FIG. 7 shows exclusively the first and second inner stator of FIG. 4.

DETAILED DESCRIPTION OF THE PREFERRED EMBODIMENTS

First Embodiment

The first embodiment is described with reference to FIGS. 1 to 3.

Figure 1:
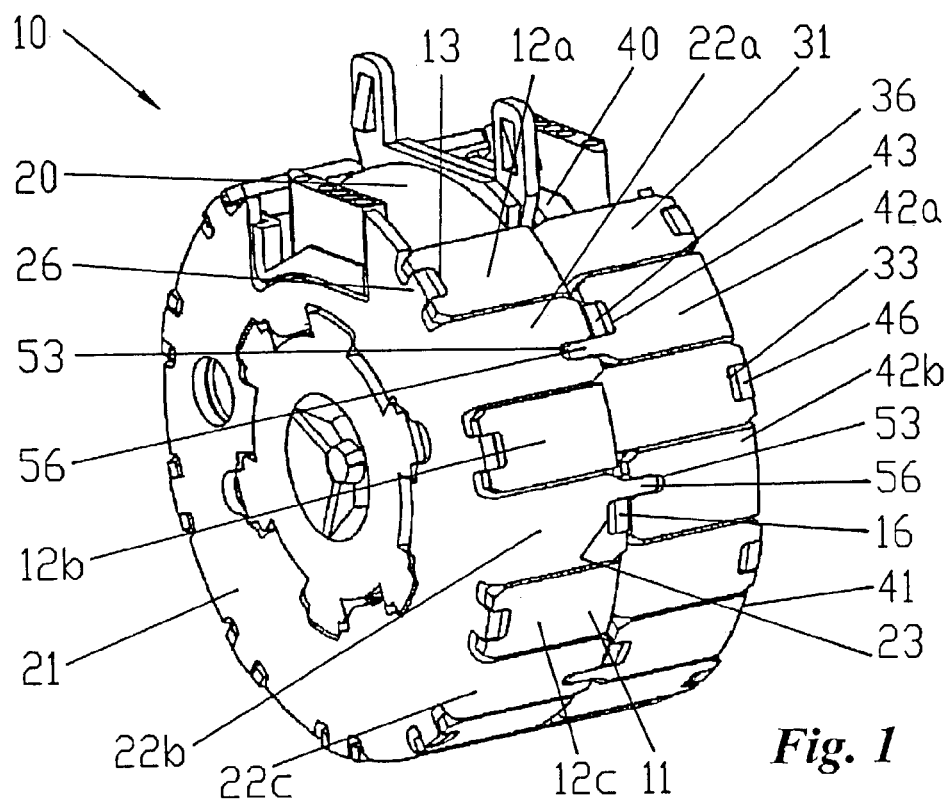
FIG. 1 shows a first embodiment of the electric motor according to the invention.

FIG. 1 shows an electric motor 10 according to the invention after being assembled.

The electronic motor 10 is e.g. a stepper motor. As components it comprises a first inner stator 11 and a first outer stator 21 which are assembled. Each of the stators 11 and 21 has at its periphery a plurality of protruding parts forming a kind of tongues 12a, 12b, 12c and 22a, 22b, 22c, respectively. These tongues 12a, 12b, 12c and 22a, 22b, 22c are bent in substantially 90 degrees and are arranged in a staggered way, such that e.g. tongue 22a of the first outer stator 21 extends substantially into the space formed by the two neighbouring tongues 12a and 12b of the first inner stator 11.

Figure 2:
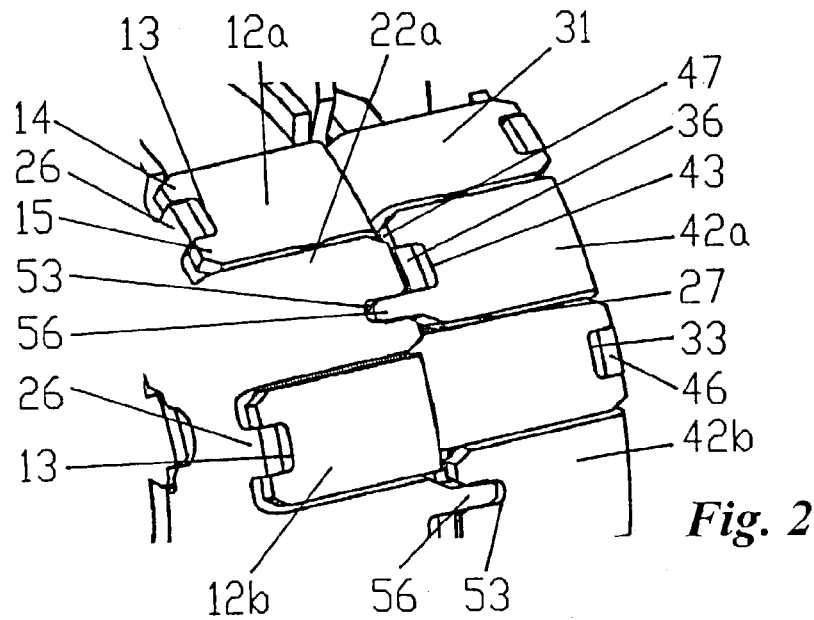
FIG. 2 shows a detail of FIG. 1.

As is shown in more detail in FIG. 2 the end of the tongues 12a, 12b, 12c is provided with a recess of a first kind 13, so that two legs are formed 14 and 15 at both side of the recess 13 which are substantially of the same length. The first outer stator 21 has at its periphery a protrusion of a first kind 26 which is received by the corresponding recess 13 of the first inner stator 11. Each recess 13 and each protrusion 26 are e.g. substantially rectangular in shape. The protrusion 26 extends laterally into the recess 13 of the respective tongue 12a, 12b, 12c so that the end of the tongue 12a, 12b, 12c of the first inner stator 11 interlocks with the corresponding protrusion 26 of the first outer stator 21.

As is shown further in FIG. 1 the first inner stator 11 has, at its periphery between a plurality of two neighbouring tongues 12b and 12c, a protrusion of a first kind 16 which is similar to the protrusion 26 of the first outer stator 21. A corresponding recess of a first kind 23 is provided at the end of the respective tongue 22b of the first outer stator 21. The protrusion 16 extends laterally into the recess 23 for forming an interlocking mechanism similar to that explained above.

As is explained further below in more detail each protrusion 16 and 26 is produced before assembly at least partially in a oversized manner relative to the recess 23 and 13, respectively, so that after assembly the interlocking mechanism between the plurality of protrusions 16, 26 and recesses 23, 13 forms a rigid connection between the first inner stator 11 and first outer stator 21.

The electric motor 10 comprises preferably a second inner stator 31 and a second outer stator 41 for increasing the available torque of the motor, i.e. for providing a more powerful motor. As is shown in FIG. 1 the second inner stator 31 and the second outer stator 41 are formed in an analogous manner as the first inner stator 11 and first outer stator 21, respectively. The second inner stator 31 is provided with recesses of the first kind 33 similar to recess 13 and with protrusions of the first kind 36 similar to protrusion 16. The second outer stator 41 is provided with recesses of the first kind 43 similar to recess 23 and with protrusions of the first kind 46 similar to protrusion 26. The recesses 33 and 43 receive the protrusions 46 and 36, respectively, for forming a similar interlocking mechanism as explained above.

The first inner stator 11 and first outer stator 21 form a first assembly. The second inner stator 31 and second outer stator 41 form a second assembly. For fitting the first assembly and second assembly together, a plurality of tongues 22b of the first outer stator 21 and a plurality of tongues 42a of the second outer stator 41 are provided each with a protrusion of a second kind 56. A respective plurality of tongues 42b of the second outer stator 41 and a respective plurality of tongues 22a of the first outer stator 21 are provided with a recess of a second kind 53 for receiving the corresponding protrusion 56 to form a rigid connection.

As is shown in FIG. 2 in more detail the protrusion of a second kind 56 is e.g. in the shape of a substantially rectangular leg which projects over the end of the tongue 42a. The recess 53 of the corresponding tongue 22a has a similar shape as the leg and receives the leg such that the front side 27 of the tongue 22a of the first outer stator 21 faces substantially the front side 47 of the corresponding tongue 42a of the second outer stator 41.

For assembling the various components of the electric motor 10, initially the first coil 20 is put on the first outer stator 21. Then the first inner stator 11 is positioned on the first outer stator 21 and subsequently the second inner stator 31 is positioned on the first inner stator 11. Then the second coil 40 is put on the second inner stator 31 and subsequently the second outer stator 41 is positioned. Finally, a predetermined pressure P is applied to the whole assembly being formed by stator 21, coil 20, stator 11, stator 31, coil 40, and stator 41 so that each protrusion 16, 26, 36, 46, 56 is pressed into a corresponding recess 23, 13, 43, 33, 53.

Figure 3:
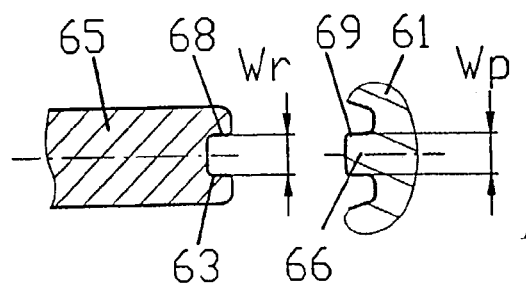
FIG. 3 shows schematically a detail of the first component and second component of the electric motor of FIG. 1 before assembly.

FIG. 3 shows the basic principle of connecting two components 61 and 65 for forming a rigid connection. The first component 61 may be e.g. the first outer stator 21 and the second component 65 may be e.g. the first inner stator 11 or the second outer stator 41.

The first component 61 has a protrusion 66 which is e.g. substantially rectangular in shape. The second component 65 has a recess 63 whose shape is similar to the protrusion 66. The protrusion 66 and the recess 63 may be e.g. the protrusion of the second kind 56 and the recess of the second kind 53 or the protrusion of the first kind and the corresponding recess of the first kind, 16 and 23, 26 and 13, 36 and 43, 46 and 33.

The components 61 and 65 are made of a rigid material, e.g. of metal such as steel. For the electric motor 10 shown in FIG. 1 the stators 11, 21, 31 and 41, which are the rigid components to be assembled, are magnetizable. In one embodiment the stators 11, 21, 31 and 41 are made of magnetizable steel, preferably soft magnetic steel, i.e. steel with a low retentivity.

The protrusion 66 is produced such that it is at least partially oversized relative to the recess 63. In order to assemble the components 61 and 65, a predetermined pressure P is applied to the first component 61 and/or second component 65. The protrusion 66 may be pressed for example laterally into the recess 63 for forming e.g. the connection between the recess 13 and the protrusion 26 shown in FIG. 2 or the components 61 and 65 may be fit together, such that the protrusion 66 and recess 63 are substantially in the same plane for forming e.g. the connection between the recess 53 and the protrusion 56 shown in FIG. 2.

Fitting together the components 61 and 65 requires a precise positioning relative to each other. In order to facilitate the assembly, the edge 68 of the recess 63 and/or the edge 69 of protrusion 66 may be rounded off or chamfered.

As the protrusion 66 is pressed into the recess 63 with some force the edge 68 of the recess 63 and the edge 69 of the protrusion 66 come at least partially in contact and interlock with each other due to dimensional interference. Typically a slight oversize is sufficient to form a rigid connection. The difference between the width Wp of the protrusion 66 and the width Wr of the recess 63 is for example in the order of 0.05 mm to 0.2 mm.

The pressure P to be applied to assemble the components 61 and 65 is a function of the difference between Wp and Wr: The greater the difference Wp−Wr, the larger the pressure P which is to be applied. A large pressure P is preferable, since the connection between the protrusion 66 and recess 63 is enhanced. However, if the difference Wp−Wr is too great, the pressure P is so large that the components 61 and 65 may be deformed when being assembled.

By way of example each protrusion 13, 23, 33, 43, 53 of the electric motor 10 shown in FIG. 1 has an oversize, so that the difference Wp−Wr is in the range of 0.05 mm to 0.2 mm. For this range of oversize the force which has to be applied to join the stators 11, 21, 31, and 41 together is in the range of 500 Newton to 5000 Newton. Assuming that the electric motor 10 has a diameter of about 36 mm, the force is applied to an area being of about 10 square centimetre and corresponds therefore to a pressure P being about in the range of 50 Newton per square centimetre to 500 Newton per square centimetre.

The interlocking mechanism between the protrusions and the recesses as explained above leads to a rigid connection between the two components to be assembled, so that they are held together exclusively by means of the rigid connections. Surprisingly, it has been found that this kind of mechanical connection is more rigid than connections used in prior art, such as welding or soldering connections.

In addition, it has been found that due to the more rigid connection the electric motor according to the invention is less prone to vibration and has a reduced noise level during operation compared to prior art electric motors. In one embodiment the noise level of an electric motor according to the invention is about 36 dB, which is about 4 dB less than the noise level of an electric motor being assembled in a conventional way.

Second Embodiment

The second embodiment is described with reference to FIGS. 4 to 9.

FIG. 4 shows an electric motor 100 according to the invention after being assembled. The electronic motor 100 is e.g. a stepper motor. As components it comprises a first inner stator 111, a first outer stator 121 and preferably a second inner stator 131 and a second outer stator 141.

The first outer stator 121 has at its periphery a plurality of protrusions 126. Further, it has a plurality of tongues 122 which are bent in substantially 90 degrees and which have at their respective end a recess 123.

The first inner stator 111 has at its periphery a plurality of protrusions 116 which are received by a corresponding recess 123 of the first outer stator 121. Further, the first inner stator 111 has a plurality of tongues 112 which are bent in substantially 90 degrees and which have at their respective end a recess 113 for receiving a corresponding protrusion 126 of the first outer stator 121.

Each protrusion 116 and 126 is produced before assembly at least partially in a oversized manner relative to the corresponding recess 123 and 113, respectively, for forming a rigid connection between the first inner stator 111 and first outer stator 121 by means of the interlocking mechanism as explained above.

By analogy with the connection between the first outer stator 121 and first inner stator 111, the second outer stator 141 and the second inner stator 131 are provided with protrusions 146 and 136, respectively and recesses 143 and 133, respectively for forming a rigid connection.

FIG. 6 shows exclusively the first inner stator 111. It has a plurality of protrusions of the third kind 166 and a plurality of recesses of the third kind 163. Correspondingly, the second inner stator 131 has a plurality of protrusions of the third kind 166 and a plurality recesses of the third kind 163.

FIG. 7 shows the first inner stator 111 and second inner stator 131, which are connected by interlocking each protrusion 166 with a corresponding recess 163.

Figure 8A:
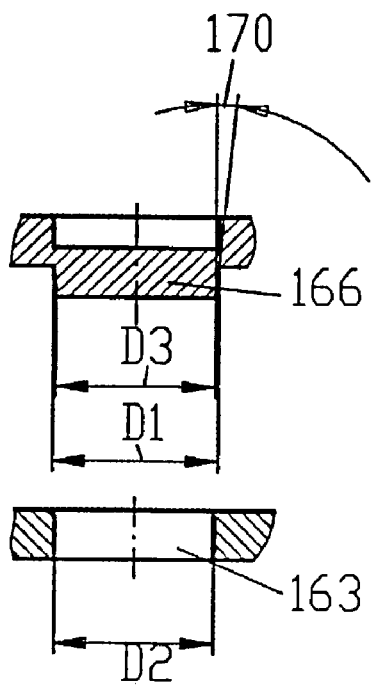
FIG. 8a shows a detail of a cross-section of the first and second inner stator of FIG. 7 before assembly.

FIG. 8a shows a cross-section of the protrusion of the third kind 166 and of the recess of the third kind 163 before assembly. The shape of the protrusion 166 is conical with a predetermined angle 170, so that the diameter D1 at the basis of the protrusion 166 is greater than the diameter D3 at the end of the protrusion 166. The recess of the third kind 163 is e.g. a hole with a predetermined diameter D2. The conical shape of the protrusion 166 facilitates its centring in the recess 163.

Figure 8B:
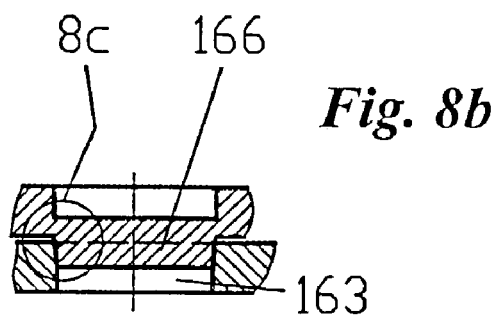
FIG. 8b shows the parts shown in FIG. 8a assembled together.

The diameter D2 is less than the diameter D1, but greater than the diameter D3, i.e. D1>D2>D3. FIG. 8b shows the parts shown in FIG. 8a after assembly, for which the protrusion 166 has been pressed into the recess 163 with a predetermined pressure P. In an analogous manner as is explained above in connection with FIG. 3, the pressure P to be applied is a function of D, where D is the difference between D1 and D2.

Figure 8C:
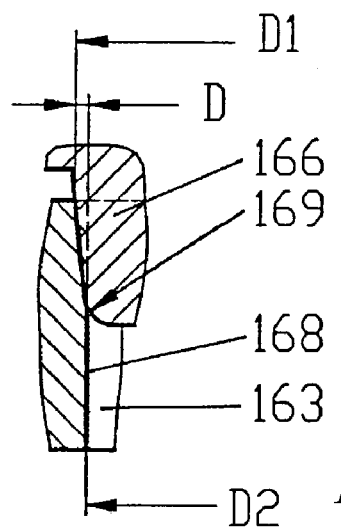
FIG. 8c shows a detail of FIG. 8b.

In order to facilitate the assembly, the edge 169 at the end of the protrusion 166 may be rounded off as shown in more detail in FIG. 8c.

Figure 9:
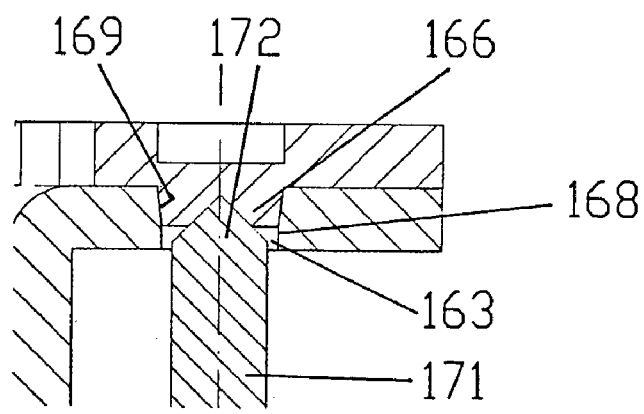
FIG. 9 shows a detail of another embodiment of the first and second inner stator of FIG. 7 after assembly.

In order to reinforce the rigid connection between the first inner stator 111 and the second inner stator 131, a pin 171 can be used. As is shown in FIG. 9 the pin 171 has an end 172 tapering off and is driven through the hole 163 at least partially into the protrusion of the third kind 166. The pin 171 expands the protrusion 166, so that its edge 169 is pressed firmly against the edge 168 of the hole 163.

The interlocking mechanism between the protrusions 116, 126, 136, 146, 166 and the corresponding recesses 123, 113, 143, 133, 163, leads to a rigid connection between the four stators 111, 121, 131, 141, so that they are held together exclusively by means of the rigid connections. As explained above these connections are more rigid than connections used in prior art and the electric motor according to the invention has a reduced noise level during operation compared to prior art electric motors.

| List of reference numbers | |
|---|---|
| 10 | first embodiment of a stepper motor |
| 11 | first inner stator |
| 12a | tongue of the first inner stator 11 |
| 12b | tongue of the first inner stator 11 |
| 12c | tongue of the first inner stator 11 |

-continued

| List of reference numbers | |
|---|---|
| 13 | recess of the first kind |
| 14 | first leg |
| 15 | second leg |
| 16 | protrusion of the first kind |
| 20 | first coil |
| 21 | first outer stator |
| 22a | tongue of the first outer stator 21 |
| 22b | tongue of the first outer stator 21 |
| 22c | tongue of the first outer stator 21 |
| 23 | recess of the first kind |
| 26 | protrusion of the first kind |
| 27 | front side of tongue 22a |
| 31 | second inner stator |
| 33 | recess of the first kind |
| 36 | protrusion of the first kind |
| 40 | second coil |
| 41 | second outer stator |
| 42a | tongue of the second outer stator 41 |
| 42b | tongue of the second outer stator 41 |
| 43 | recess of the first kind |
| 46 | protrusion of the first kind |
| 47 | front side of tongue 42a |
| 53 | recess of the second kind |
| 56 | protrusion of the second kind |
| 61 | first component before assembly |
| 63 | recess |
| 65 | second element before assembly |
| 66 | protrusion |
| 68 | edge of recess 63 |
| 69 | edge of protrusion 66 |
| 100 | second embodiment of a stepper motor |
| 111 | first inner stator |
| 112 | tongue of the first inner stator 111 |
| 113 | recess |
| 116 | protrusion |
| 121 | first outer stator |
| 122 | tongue of the first outer stator 121 |
| 123 | recess |
| 126 | protrusion |
| 131 | second inner stator |
| 133 | recess |
| 136 | protrusion |
| 141 | second outer stator |
| 143 | recess |
| 146 | protrusion |
| 163 | recess of the third kind |
| 166 | protrusion of the third kind |
| 168 | edge of recess 163 |
| 169 | edge of protrusion 166 |
| 170 | angle of the cone of protrusion 166 |
| 171 | pin |
| 172 | end of pin 171 |
| D1 | diameter at the basis of protrusion 166 |
| D2 | diameter of recess 163 |
| D3 | diameter at the end of protrusion 166 |
| D | D1–D2 |
| P | pressure |
| Wp | width of protrusion 66 |
| Wr | width of recess 63 |

What is claimed is:

1. A method of producing an electric motor, the method comprising the steps of:

producing a first rigid stator component, with at least one first recess;

producing a second rigid stator component, with at least one first protrusion being at least partially oversized relative to the first recess;

pressing the first protrusion into the first recess with a predetermined pressure for forming a rigid connection between the first and second stator component;

producing a third rigid stator component, with at least one second recess;

producing a fourth rigid stator component, with at least one second protrusion being at least partially oversized relative to the second recess; and pressing the second protrusion into the second recess with the predetermined pressure for forming a rigid connection between the third and fourth component.

2. The method of claim 1, wherein the first rigid component is produced with at least one third recess and the third rigid stator component is produced with a third protrusion which is at least partially oversized relative to the third recess and which is pressed into the third recess with the predetermined pressure for forming a rigid connection between the first and third stator component.

3. The method of claim 1, wherein the first rigid stator component has a first plurality of bent tongues, the first recess being formed in one of the first plurality of bent tongues; and wherein the third rigid stator component has a second plurality of bent tongues, the second recess being formed in one of the second plurality of tongues.

4. The method of claim 3, wherein the first plurality of tongues and the second plurality of tongues are bent substantially ninety degrees.

5. A method of producing an electric motor, the method comprising the steps of:

producing a first rigid stator component, with at least one first recess;

producing a second rigid stator component, with at least one first protrusion being at least partially oversized relative to the first recess;

pressing the first protrusion into the first recess with a predetermined pressure for forming a rigid connection between the first and second stator component; and driving a pin with an end tapering off at least partially into the first protrusion for reinforcing the rigid connection.

6. The method of claim 5, wherein the at least one first recess is formed in the shape of a hole.

* * * * *